(12) United States Patent
Caunter et al.

(10) Patent No.: US 8,060,603 B2
(45) Date of Patent: Nov. 15, 2011

(54) PERSISTENT PERSONAL MESSAGING IN A DISTRIBUTED SYSTEM

(75) Inventors: Mark Leslie Caunter, Christchurch (GB); Bruce Kelly Jackson, Bournemouth Dorset (GB); Steven Geach, Weymouth Dorset (GB)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 12/141,619

(22) Filed: Jun. 18, 2008

(65) Prior Publication Data

US 2009/0319615 A1 Dec. 24, 2009

(51) Int. Cl.
*G06F 15/173* (2006.01)

(52) U.S. Cl. ........................................... 709/224

(58) Field of Classification Search ........... 709/217–224
See application file for complete search history.

(56) References Cited

U.S. PATENT DOCUMENTS

| | | | |
|---|---|---|---|
| 5,812,865 A | 9/1998 | Theimer et al. | |
| 6,366,956 B1 | 4/2002 | Krishnan | |
| 6,751,619 B1 | 6/2004 | Rowstron et al. | |
| 6,766,323 B2 | 7/2004 | Beaven et al. | |
| 7,055,170 B1* | 5/2006 | Karmouch et al. | 726/2 |
| 7,096,259 B1* | 8/2006 | Gray et al. | 709/223 |
| 7,127,047 B2* | 10/2006 | Wasmeier | 379/88.25 |
| 7,188,150 B2* | 3/2007 | Grueneberg et al. | 709/217 |
| 7,269,623 B2 | 9/2007 | Neely, III | |
| 7,316,016 B2 | 1/2008 | DiFalco | |
| 7,318,109 B2* | 1/2008 | Liscano et al. | 709/244 |
| 7,356,567 B2 | 4/2008 | Odell et al. | |
| 7,516,201 B2 | 4/2009 | Kovacs et al. | |
| 7,516,210 B2* | 4/2009 | Liscano et al. | 709/224 |
| 2002/0120714 A1 | 8/2002 | Agapiev | |
| 2003/0101343 A1* | 5/2003 | Eaton et al. | 713/170 |
| 2003/0144894 A1 | 7/2003 | Robertson et al. | |
| 2004/0019465 A1 | 1/2004 | Kerr et al. | |

(Continued)

FOREIGN PATENT DOCUMENTS

EP 1437656 7/2004

(Continued)

OTHER PUBLICATIONS

International Search Report and Written Opinion—PCT/US09/47226, International Search Authority—European Patent Office—Mar. 8, 2010.
Keith Edwards: "Core Jini"Core Jini, Prentice Hall PTR, Indianapolis, US, Jun. 1, 1999, XP002178476.

(Continued)

*Primary Examiner* — Krisna Lim
(74) *Attorney, Agent, or Firm* — Fariba Yadegar-Bandari (57) ABSTRACT

A persistent personal messaging system provides tuple space functionality supporting a user changing between a plurality of client devices, even within a loosely coupled, distributed system for persistent personal messaging. A user, irrespective of which messaging client they are using, logs on to the system. The act of logging on places a tuple, representing the user, into the tuple space. A "contacts" service agent finds the friends and groups that the user belongs to and notifies other users that the user has logged on. Given the on-line status of other users and groups, a "history" service agent will retrieve previous messages from the tuple space that formed the user's conversations with users and groups, as if the user had never logged off or switched devices. When the user adds a new message to any conversation, the message is added as a tuple to the tuple space.

46 Claims, 5 Drawing Sheets

U.S. PATENT DOCUMENTS

| | | | |
|---|---|---|---|
| 2004/0034807 A1* | 2/2004 | Rostowfske | 714/4 |
| 2004/0122803 A1 | 6/2004 | Dom et al. | |
| 2004/0186766 A1 | 9/2004 | Fellenstein et al. | |
| 2004/0225897 A1 | 11/2004 | Norton | |
| 2005/0102389 A1* | 5/2005 | Liscano et al. | 709/224 |
| 2005/0177385 A1 | 8/2005 | Hull et al. | |
| 2006/0010237 A1* | 1/2006 | Banatre et al. | 709/227 |
| 2006/0031206 A1 | 2/2006 | Deubel et al. | |
| 2006/0218153 A1 | 9/2006 | Voon et al. | |
| 2006/0242256 A1* | 10/2006 | Gray et al. | 709/213 |
| 2006/0271460 A1 | 11/2006 | Hanif | |
| 2007/0005654 A1 | 1/2007 | Schachar et al. | |
| 2008/0009268 A1 | 1/2008 | Ramer et al. | |
| 2008/0010262 A1* | 1/2008 | Frank | 707/3 |
| 2008/0065685 A1* | 3/2008 | Frank | 707/102 |
| 2008/0196087 A1 | 8/2008 | Ranjit | |
| 2009/0063423 A1* | 3/2009 | Jackson et al. | 707/3 |
| 2009/0077480 A1* | 3/2009 | Caunter et al. | 715/764 |
| 2009/0319385 A1* | 12/2009 | Jackson et al. | 705/26 |
| 2009/0319599 A1* | 12/2009 | Caunter et al. | 709/203 |
| 2009/0320097 A1* | 12/2009 | Jackson et al. | 726/3 |

FOREIGN PATENT DOCUMENTS

| | | |
|---|---|---|
| WO | WO03010689 A1 | 2/2003 |
| WO | WO2006047879 | 5/2006 |
| WO | WO2006066151 | 6/2006 |

OTHER PUBLICATIONS

Lehman T J et al: "Hitting the distributed computing sweet spot with TSpaces" Computer Networks, Elsevier Science Publishers B.V., Amsterdam, NL, vol. 35, No. 4, Mar. 1, 2001, pp. 457-472, XP004304859 ISSN: 1389-1286.

Raverdy P et al: "Efficient Context-aware Service Discovery in Multi-Protocol Pervasive Environments"Mobile Data Management, 2006. MDM 2006. 7th International Conference O N Nara, Japan May 10-12, 2006, Piscataway, NJ, USA.IEEE, May 10, 2006, pp. 3-3, XP.

Wyckoff P et al: "T Spaces"IBM Systems Journal, IBM Corp. Armonk, New York, US, vol. 37, No. 3, Jan. 1, 1998, pp. 454-474, XP000783107ISSN: 0018-8670.

Citations Categories: X Mobile Commerce: Need to leave the country? Now you can do it faster . . . ; New travel deals search expands world of WAP M2 Presswire, Jun. 7, 2005, pp. 1-2, XP008096285 the whole document.

Gelernter David: "Generative communication in Linda" ACM Transactions on Programming Language and Systems, ACM, New York, NY, vol. 7, No. 1, Jan. 1, 1985, pp. 80-112, XP008089314 ISSN: 0164-0925.

Hyoguchi K: "Advertising strategies tap cell phones" Nikkei Weekly, Nihon Keizai Shimbun, JP, Oct. 6, 2003, pp. 1-3, XP008096219 ISSN: 0918-5348 the whole document.

\* cited by examiner

PERSISTENT PERSONAL MESSAGING IN A DISTRIBUTED SYSTEM

REFERENCE TO CO-PENDING APPLICATIONS FOR PATENT

The present Application for Patent is related to the co-pending U.S. patent application Ser. No. 12/141,478, entitled "User Interfaces For Service Object Located In A Distributed System" by Jackson et al., filed on even date herewith, assigned to the assignee hereof, and expressly incorporated by reference herein; and U.S. patent application Ser. No. 12/141,682, entitled "Apparatus and Method of Managing Electronic Communities of Users" to Jackson et al., filed on even date herewith, assigned to the assignee hereof, and expressly incorporated by reference herein, which in turn claimed priority to Provisional Application No. 60/945,091 entitled "Apparatus and Method of Managing Communities of Users" filed 19 Jun. 2007.

BACKGROUND

1. Field

The described aspects relate to interactive workspaces and ubiquitous computing. More particularly, it pertains to an infrastructure for a population of disparate computing platforms to readily interface to a service object located in a distributed system to obtain persistent personal messaging.

2. Background

A distributed computer system, such as but not limited to the Internet, is characterized by rapid, real-time interchange among many dissimilar processes executing simultaneously on a large array of dissimilar and geographically diverse processors. A distributed computer system's resources are usually spatially separated, and the execution of its applications often involves multiple execution threads that can be widely separated in time.

Operators for a population of users of client devices compete in a competitive, evolving communication marketplace. It is difficult to satisfy user expectations for various services, especially over distributed computer systems. Often, user expectations are at variance with each other in having different preferred service providers, such as searching. In addition, certain types of content can be segregated in different nodes of a distributed network with proprietary interfaces that frustrate accessing these services.

Client devices are increasingly mobile with communication capabilities as their principal purpose or having wireless communication capabilities to extend connectivity. End users desire to access services with these mobile communication devices that were previously the domain of terminals, work stations, and general purpose computers. The latter devices intended for general purpose computing have had a tendency toward standardization, or at least to accommodate a wide range of usage environments. By contrast, mobile communication devices are progressed with a priority toward economic manufacture, small size and extended battery service life with performance focused on wireless communication rather than processing capabilities. Furthermore, the evolution of broadcast bands and protocols has tended to encourage a proliferation in communication chipsets. As such, offering of various services to users of mobile communication devices has been limited, especially as compared to the larger current market for users of general purpose computers.

A number of obstacles discourage addressing the challenges of deploying services to mobile communication devices as is conventional for a general purpose computer. The communication bandwidth to mobile communication devices is often constrained as compared to broadband channels to general purpose computers, discouraging downloading of interfacing software to properly configure the mobile communication device for various services. Often the user interface of the mobile communication device is severely constrained in size, limiting display size and the number of control buttons that can be presented, further complicating such configuring. Moreover, many users tend to make use of mobile communication devices in situations (e.g., traveling) that do not lend themselves to such focused interaction.

One such function that is complicated by the unique constraints and pattern of usage of mobile devices is instant messaging. Often, a person will use several different instances of an Internet messaging client, such as on a desktop personal computer (PC) at work, on a laptop PC at home and on a mobile device. One problem is that there is no continuity between using the different devices. A conversation with a single person or a group that is started on a client running on the PC is broken and lost once the user switches to the client on the laptop or mobile device.

SUMMARY

The following presents a simplified summary in order to provide a basic understanding of some aspects of the present disclosure. This summary is not an extensive overview and is intended to neither identify key or critical elements nor delineate the scope of such aspects. Its purpose is to present some concepts of the described aspects in a simplified form as a prelude to the more detailed description that is presented later.

In accordance with one or more aspects and corresponding disclosure thereof, various features are described in connection with use of a client device, such as a mobile communication device, for accessing services via a loosely coupled, distributed network that advantageously maintains continuity of instant messaging communications in a tuple space that can be readily accessed from a wide variety of computing platforms, providing seamless accessibility to various remote clients.

In one aspect, a method is provided for persistent messaging services to a population of client devices connected to a distributed network. A user tuple is placed in a tuple space for a user initiating active communicating with a persistent messaging service from a client device. A message tuple stored in the tuple space is located that matches the user tuple for a prior messaging session. A historical message derived from the message tuple is sent to the client device.

In another aspect, at least one processor is provided for persistent messaging services to a population of client devices connected to a distributed network. A first module places a user tuple in a tuple space for a user initiating active communicating with a persistent messaging service from a client device. A second module locates a message tuple stored in the tuple space that matches the user tuple for a prior messaging session. A third module sends a historical message derived from the message tuple to the client device.

In an additional aspect, a computer program product is provided for persistent messaging services to a population of client devices connected to a distributed network. A computer-readable medium comprising sets of codes for causing a computer to place a user tuple in a tuple space for a user initiating active communicating with a persistent messaging service from a client device, to locate a message tuple stored in the tuple space that matches the user tuple for a prior messaging session, and to send a historical message derived from the message tuple to the client device.

In a further aspect, an apparatus is provided for persistent messaging services to a population of client devices connected to a distributed network that has means for placing a user tuple in a tuple space for a user initiating active communicating with a persistent messaging service from a client device, means for locating a message tuple stored in the tuple space that matches the user tuple for a prior messaging session, and means for sending a historical message derived from the message tuple to the client device.

In yet another aspect, an apparatus is provided for persistent messaging services to a population of client devices connected to a distributed network. A computing platform hosts a tuple space performing a persistent messaging service. A messaging gateway places a user tuple in the tuple space for a user initiating active communication between a client device and the messaging gateway via a communication network. The messaging gateway further locates a message tuple stored in the tuple space that matches the user tuple for a prior messaging session and sending a historical message derived from the message tuple to the client device via the communication network.

In yet an additional aspect, a method is provided for receiving persistent messaging services from a distributed network. An initiation of active communicating with a persistent messaging service from a client device causes placement of a user tuple in a tuple space for a user. The initiation further causes locating of a message tuple stored in the tuple space that matches the user tuple for a prior messaging session. A historical message can then be received that is derived from the message tuple.

In yet a further aspect, at least one processor is provided for receiving persistent messaging services from a distributed network. A first module initiates active communicating with a persistent messaging service from a client device to cause placement of a user tuple in a tuple space for a user, and to cause locating of a message tuple stored in the tuple space that matches the user tuple for a prior messaging session. A second module receives a historical message derived from the message tuple to the client device.

In yet a further additional aspect, a computer program product is provided for receiving persistent messaging services from a distributed network. A computer-readable medium comprises sets of codes for causing a computer to initiate active communicating with a persistent messaging service from a client device to cause placement of a user tuple in a tuple space for a user, and to cause locating of a message tuple stored in the tuple space that matches the user tuple for a prior messaging session, and to receive a historical message derived from the message tuple to the client device.

In yet another additional aspect, an apparatus is provided for receiving persistent messaging services from a distributed network, having means for initiating active communicating with a persistent messaging service from a client device to cause placement of a user tuple in a tuple space for a user, and to cause locating of a message tuple stored in the tuple space that matches the user tuple for a prior messaging session, and having means for receiving a historical message derived from the message tuple to the client device.

In another additional aspect, an apparatus is provided for receiving persistent messaging services from a distributed network. A communication module controls a transmitter and a receiver for communicating over a communication network to a gateway that operably interacts with a tuple space performing a persistent messaging service. A user interface initiates active communicating with a persistent messaging service via the communication module to cause placement of a user tuple in the tuple space for a user, and to cause locating of a message tuple stored in the tuple space that matches the user tuple for a prior messaging session. The user interface receives via the communication module and receiver a historical message derived from the message tuple.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects and versions may be employed. Other advantages and novel features will become apparent from the following detailed description when considered in conjunction with the drawings and the disclosed versions are intended to include all such aspects and their equivalents.

DETAILED DESCRIPTION

A persistent personal messaging system provides tuple space functionality supporting a user changing between a plurality of client devices, even within a loosely coupled, distributed system for persistent personal messaging. A user, irrespective of which messaging client they are using, logs on to the system. The act of logging on places a tuple, representing the user, into the tuple space. A "contacts" service agent finds the friends and groups that the user belongs to and notifies other users that the user has logged on. Given the on-line status of other users and groups, a "history" service agent will retrieve previous messages from the tuple space that formed the user's conversations with users and groups, as if the user had never logged off or switched devices. When the user adds a new message to any conversation, the message is added as a tuple to the tuple space. Because tuples have a lease, old messages in a conversation can be expired automatically (or persisted externally) after a determined period of time. Because of the nature of a tuple space, it is also possible to search across the tuple space for commonality amongst users and groups to create virtual super groups. A super group can be targeted with specific messages. For example, a super group which contains all current users and groups which have an interest in football can be targeted by a "shout" service agent that will inject a latest football result into their conversations.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
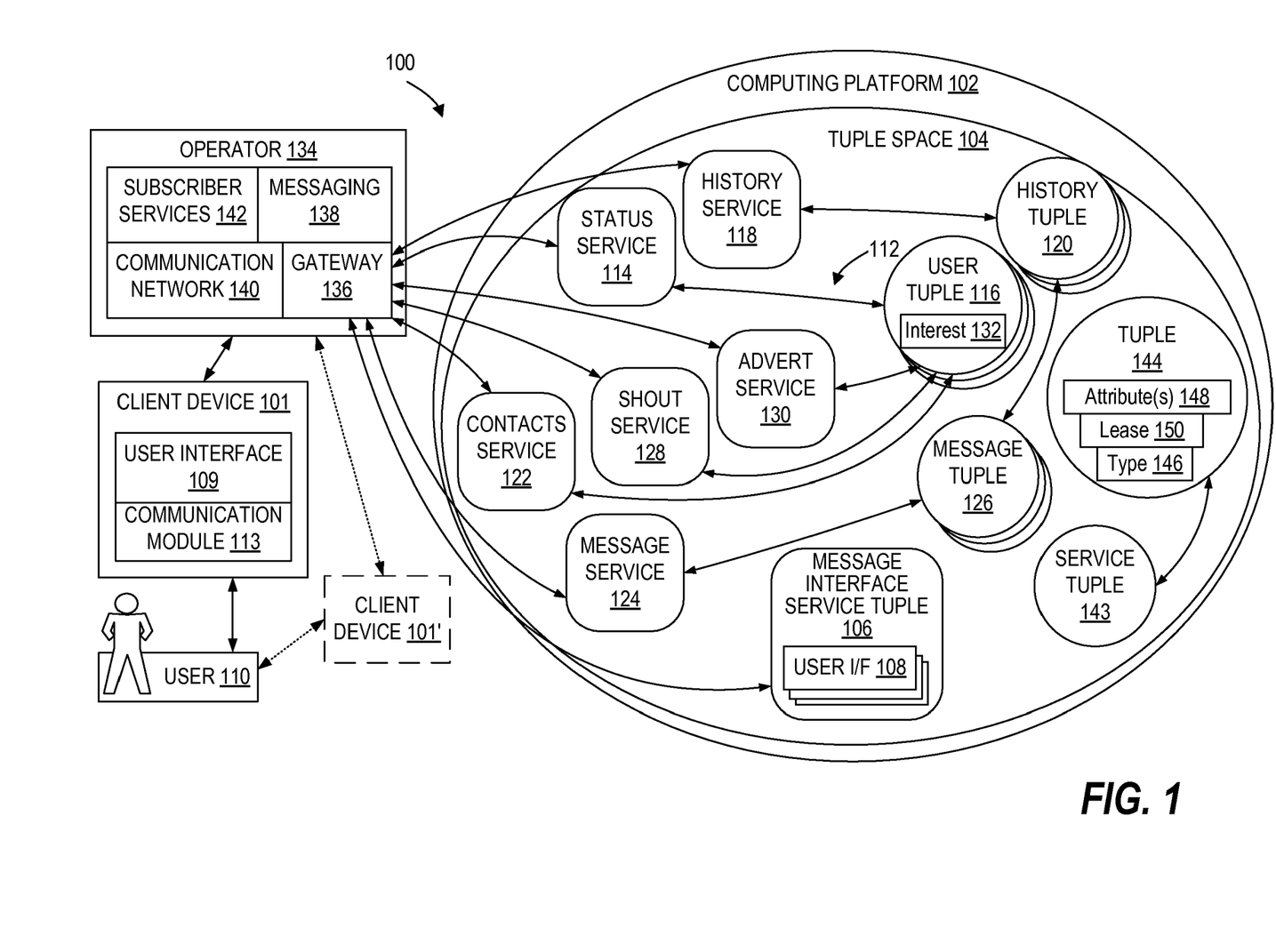
FIG. 1 is a schematic diagram of one aspect of a system for persistent personal messaging via a plurality of client devices via to distributed network services.

In FIG. 1, a distributed system 100 allows client devices 101, such as mobile communication devices, to examine a tuple space 104 operating on a computing platform 102 to find messaging services, such as a messaging interface service tuple 106. An appropriate attributes, depicted as user interface code 108 from the service tuple 143 can then be loaded and executed as a search interface 109 on the client device 101 in the illustrative depiction. Thereby, a user 110 can interact with persistent messaging services 112 via a communication module 113 of the client device 101 to maintain continuity with a prior messaging conversation that the user 110 engaged in via another client device 101'.

In the illustrative depiction, the persistent messaging system 112 includes a status service tuple 114 that interacts with user tuples 116. A history service tuple 118 interacts with history tuples 120. A contacts service tuple 122 interacts with the user tuples 116. A messaging service tuple 124 interacts with a message tuple 126 that in turn can interact with the history tuples 120. A shout service tuple 128 and an advert service tuple 130 each interacts with interest attributes 132 of the user tuples 116.

An operator 134, such as a carrier for digital services via a radio access network or digital cellular service, can provide a gateway 136 between the client device 102 and the tuple space 104. In particular a messaging component 138 that relays personal messaging through a communication network 140 to the plurality of client devices 102 as validated by a subscriber services component 142.

The tuple space 104 is a globally shared, associatively addressed memory space that is organized as a grouping of tuples. A "tuple" is the basic element of a tuple space system. In the context of a tuple space based coordination language like Linda, a tuple is a vector having fields or values of certain types. In a broader sense, a "tuple" is an entry in an information storage system. For example, a row in a relational database system can be referred to as a tuple.

In Linda-like languages, constructs called "templates" are used to associatively address tuples via matching techniques. A template matches a tuple if they have an equal number of fields and if each template field matches the corresponding tuple field.

Tuple space based coordination languages provide a simple yet powerful mechanism for inter-process communication and synchronization, which is the crux of parallel and distributed programming. A process with data to share generates a tuple and places it into the tuple space. A process requiring data simply requests a tuple from the tuple space. Tuple space programs may be easier to write and maintain for a number of reasons including the following:

(1) Destination uncoupling (fully anonymous communication)—the creator of a tuple requires no knowledge about the future use of that tuple or its destination.

(2) Spatial uncoupling—because tuples are retrieved using an associative addressing scheme, multiple address-space-disjoint processes can access tuples in the same way.

(3) Temporal uncoupling—tuples have their own life span, independent of the processes that generated them or any processes that may read them. This enables time-disjoint processes to communicate seamlessly.

The implementation of the tuple space can be either "closed" or "open." The closed implementations use compile time analysis of object and source code to provide highly efficient closed programs. The open implementations allow processes, agents, and programs to coordinate through tuple spaces without the run-time system requiring any prior knowledge. Essentially, the open implementations provide a persistent data store.

The Linda language uses three standard instructions or primitives. These are (with their informal semantics):

(1) out(tuple) Insert a tuple into a tuple space.

(2) in(template) If a tuple exists that matches the template, then remove the tuple and return it to the agent performing the in. If no matching tuple is available, then the primitive blocks until a matching tuple is available.

(3) rd(template) If a tuple exists that matches the template, then return a copy of the tuple to the agent that performed the rd. If there is no matching tuple, then the primitive blocks until a matching tuple is available.

Tuple space 104 comprises a data repository, and each of a service tuple 143 and a data tuple 144 placed in tuple space 104 comprises an object having an ordered set of data comprising a tuple type 146 and tuple attributes 148. Further, tuple attributes 148 may vary depending upon tuple type 146. The tuple space 104 comprises an abstract space operable to receive data objects, e.g. tuple 144, and includes a predetermined set of operations that can be performed within the space. For example, the predetermined set of functions may include an "in" function and a "rd" function, which both take input parameters that allow the selection of specific tuples in the space by matching the input parameters, where given, with those values present within the tuple space. Additionally, both the "in" and "rd" functions may have non-blocking equivalents (inp and rdp). In some aspects, the predetermined set of functions may include a set of operations, such as JAVA methods, that may be performed on both tuple space 104 and tuple 144.

Further, in a specific example, each tuple 144 is an instance of a com.qualcomm.qspaces.linda.Tuple class or subclass, and is created with a set of attributes 148, defined by an array of objects which are specified when the tuple is constructed. The array can be zero-length, however, in some aspects, the array may not be null. In addition, in some aspects, none of the individual attribute objects in the array may be null.

In some aspects, when the tuple 144 is first constructed, and every time the respective attributes 148 are retrieved from the respective tuple, the array of objects may be defensively copied using a very fast form of in-memory serialization. This process allows the tuple 144 to be immutable, and therefore, guarantees the integrity of tuple space 104 in which the tuple 144 resides.

In the above-noted aspects, tuple equality adheres to the same equality principles of any JAVA object, including the symmetry rule which states that if t1.equals(t2) then t2.equals (t1).

Specifically, a tuple equals another tuple, e.g. t1.equals(t2), if t2, known as a template, meets the following criteria:

1) The class 120 of the template t2 is the same class 120 as the tuple t1.

2) The attributes 122 of the template t2 are equal to the attributes 122 of the tuple t1, meaning that t2's attributes 122 are the same as t1's attributes 122, irrespective of their order.

In other aspects, a tuple matches another tuple, e.g. t1.matches(t2), if t2, known as a template, meets the following criteria:

1) The class 120 of the template t2 is the same class 120 or a super class of the tuple t1.

2) The attributes 122 of the template t2 match the attributes 122 of the tuple t1, meaning that t2's attributes 122 are the same set or a subset of t1's attributes 122, irrespective of their order.

When matching one tuple with another, the symmetry rule does not apply; so, t1.matches(t2) does not necessarily equate to t2.matches(t1).

In some aspects, the comparison of one set of tuple attributes 148 with another uses the normal object equality rules, so any object used as a tuple attribute 148 can implement the object.equals(Object obj) and object.hashcode( ) methods.

A tuple 144 is added to tuple space 104 with a lease 150. Lease 150 is a period of time, for example specified in milliseconds, which defines how long the tuple will remain in the respective tuple space 104. For example, lease 150 having a value of zero may indicate that the respective tuple never expires. Once lease 150 has expired for a respective tuple, the tuple is automatically removed from tuple space 104.

Service tuples 143 represent services that interact with by clients of the tuple space 104, such as client devices 101. Further, service tuples 143 are also autonomous "live" JAVA objects in their own right, which may also interact with tuple space 104 and other tuples in the space. Service tuples 143 may be discovered in the same manner as other tuples, e.g. by matching the class and attributes 148 of the tuple. In some aspects, service tuples 143 may not be used in this way, however, rather service tuples 143 are interacted with indirectly by placing other tuples, such as data tuples 144, into tuple space 104.

For example, a client, such as a respective client device 101, may create data tuple 144 of class A with attributes "abc" and "123," and places the tuple into tuple space 104. As such, data tuple 144 can be described using the following notation:

(A, "abc", 123).

Service tuple 143 is a live object which can interact with tuple space 104 in the same way as a client application. As such, in this example, service tuple 143 has been instantiated and is blocking on a read from tuple space 104 for any tuples with a matching template for class "A" and any attributes. Such a matching criterion can be described as follows:

(A, ?s, ?x)

where ?s and ?x mean that any values of the string s and the integer x will be matched. Consequently, tuple space 104 matches the template from service tuple 106, and will then read tuple A from tuple space 104. In this manner, the described aspects pass parameters in the form of tuples to a service.

Further, in system 100, it is possible to embed objects that represent user interfaces 108 into the service objects themselves. Consider the following user interface service tuple:

(A, [Java], [Flash], [uiOne])

The service tuple 143, for instance, can contains three user interface objects, such as a user interface A attribute (e.g., defined in JAVA™), a user interface B attribute (e.g., defined in ADOBE FLASH) and a user interface C (e.g., defined in uiOne™ technologies of QUALCOMM Incorporated of San Diego, Calif.). In the context of mobility, the present aspects enable the offering of a service across a wide variety of wireless devices, each with its own specific requirements, whether in terms of support of different technologies such as Java, Flash or uiOne, or even multiple variants of a single technology, optionally including optimizations for screen size or other device-specific properties. A respective client device (and corresponding application) 101 and/or any other party to system 100, is thus able to locate a user interface service object and then load user interface components from it.

Data tuple 144 may be placed into tuple space 104 either directly by a respective client device 101, such as a wireless device, or alternately by a data source, such as operator gateway 136, as a service with which client device 101 interacts, or a service connected to the service interacting with client device 101. For example, client device 101 may be any type of computerized wireless device, such as a cellular telephone, a satellite telephone, a PDA, a laptop computer, etc.

Figure 2:
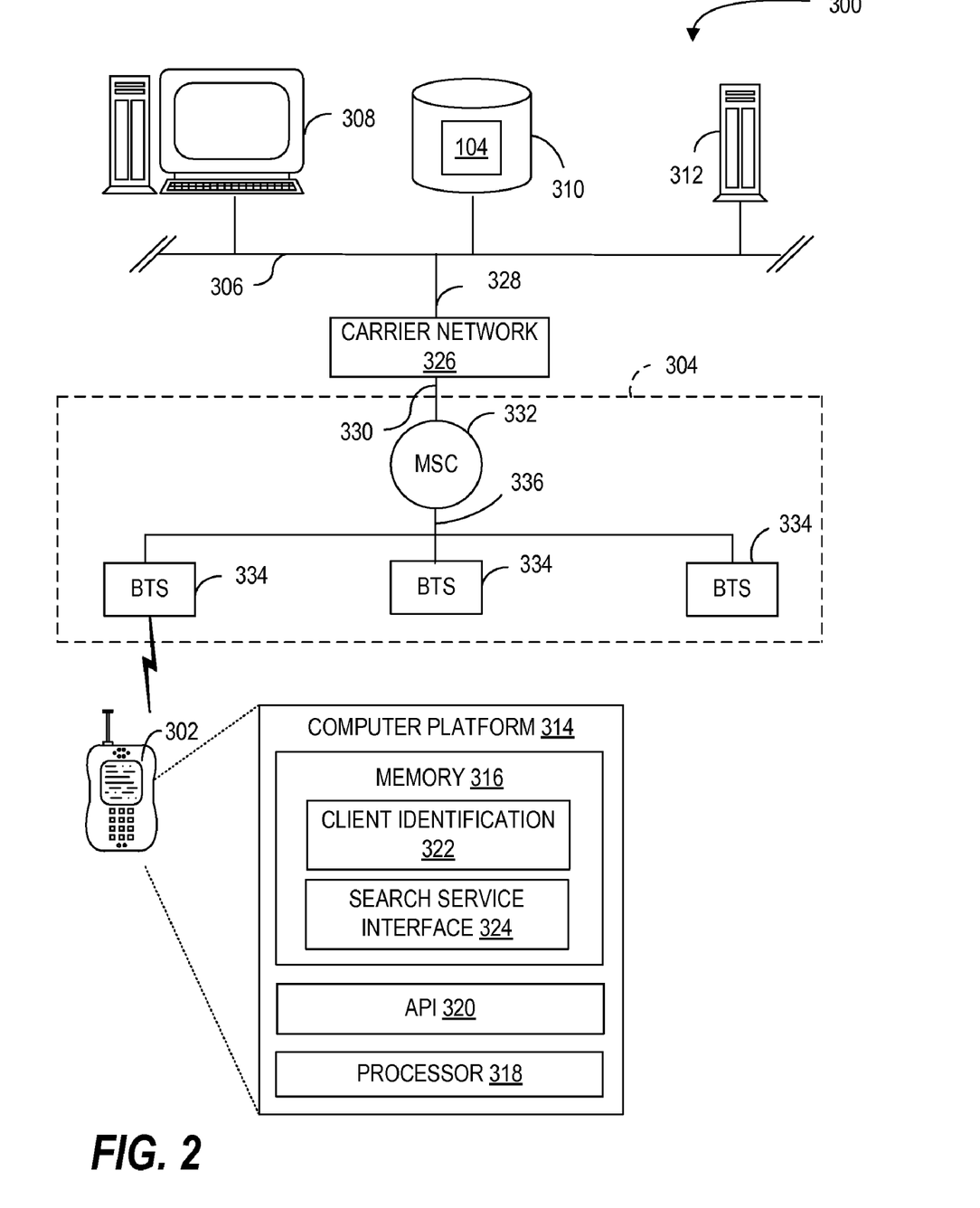
FIG. 2 is a schematic diagram of one aspect of a communication network operable with the system of FIG. 1.

Referring to FIG. 2, for example, a communications network 300 includes one or a plurality of client devices 302, wireless telephone devices in this case, that utilizes a wireless network 304 to communicate with wired network 306 (e.g. a local area network, LAN, etc.) having network device or server 308 and/or storage device 310 and/or data source 312. One or both of network device/server 308 and/or storage device 310 may include tuple space 104 and some portions the above-discussed components of system 100. Further data source 312 may include a processor and a memory in communication with the processor, wherein the memory comprises a tuple generation module having tuple generation logic operable to generate a plurality of data tuples from any source of data operable to readily interface with unknown services, such as a web-based transactional service. In particular, wireless device 101 includes a computer platform 314 having a memory 316 in communication with a processor 318, such as via an application programming interface (API) 320 that enables interaction with any resident applications, such as client identification component 322 and a search service interface 324 that is located in tuple space 104.

Further, network device or server 308 and/or storage device 310 and/or data source 312 may include a processor and a memory in communication with the processor, as well as an interfacing, search and rating module (not depicted) stored in the memory and executable by the processor, wherein the interface, search and rating module comprises tuple space 104, service tuple 143, and rating service tuple 118, described above. Wireless network 304 is connected to wired network 306 via a carrier network 326. Network device or server 308 and/or storage device 310 and/or data source 312 may be present on communications network 300 with any other network components that are desired to provide community management capabilities and/or cellular telecommunication services. Network device or server 308 and/or storage device 310 and/or data source 312 may communicate with carrier network 326 through data links 328 and 330, which may be data links such as the Internet, a secure LAN, WAN, or other network. Carrier network 326 controls messages (generally being data packets) sent to a mobile switching center (MSC) 332. Further, carrier network 326 communicates with MSC 332 by the network 330, such as the Internet, and/or POTS (plain old telephone service). For example, in network 330, a network, or Internet portion transfers data and the POTS portion transfers voice information. MSC 332 may be connected to multiple base stations (BTS) 334 by another network 336, such as a data network and/or Internet portion for data transfer and a POTS portion for voice information. BTS 334 ultimately broadcasts messages wirelessly to the wireless communication devices 302, for example using predetermined voice and/or data packet services, such as Code Division Multiple Access (CDMA) and short messaging service (SMS), respectively, or any other over-the-air methods. Thus, communication network 300, in combination with system 100 (FIG. 1), allow for the discovery, creation and management of electronic or on-line user media access based on relationships discovered between data objects in a tuple space.

Figure 3:
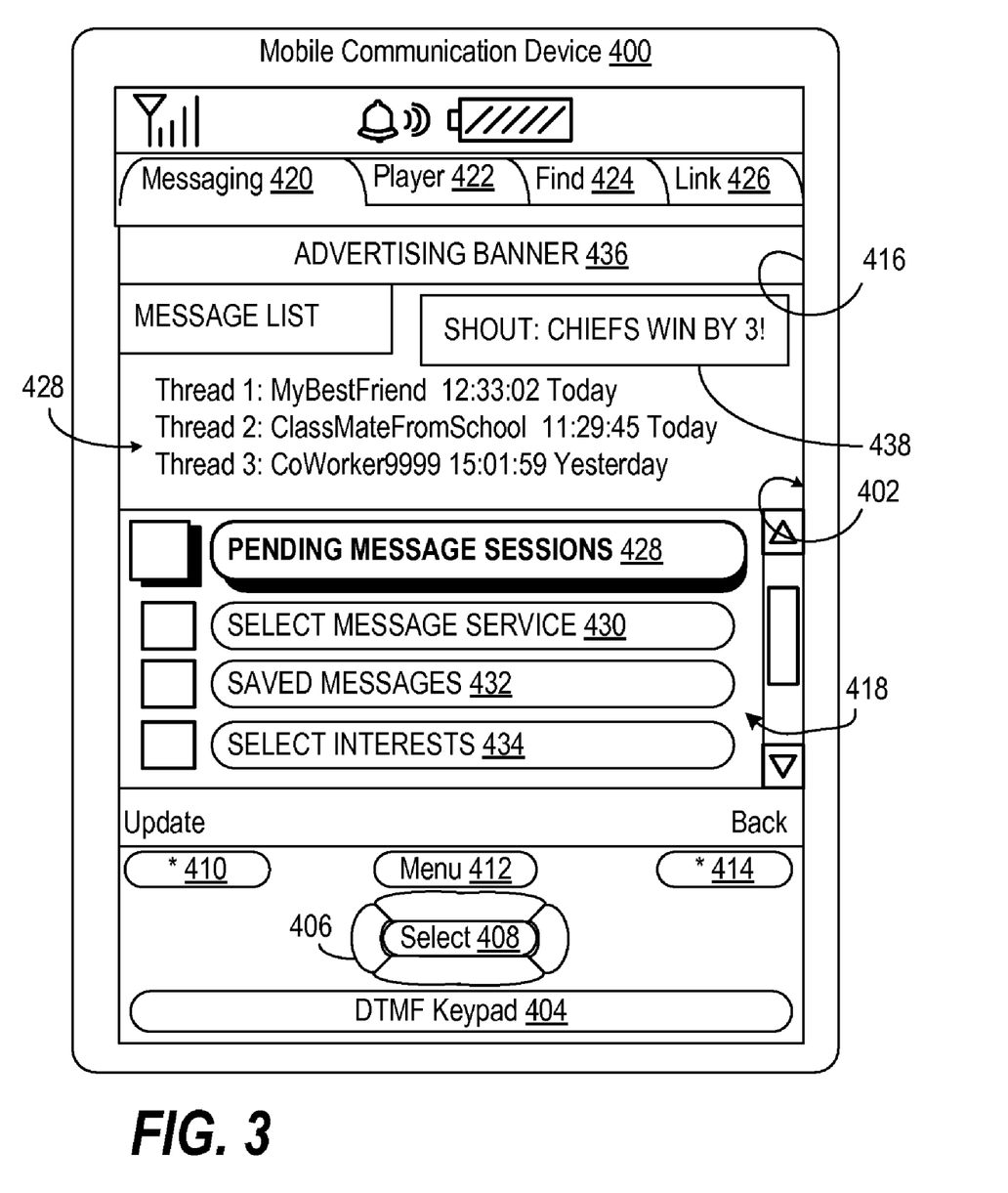
FIG. 3 is a diagram of an illustrative client device having an optimized rated search results displaced, according to one aspect.

It should be noted that FIG. 3 is a representative diagram that more fully illustrates the components of a wireless communication network and the interrelation of the elements of one aspect of the present system. Communications network 300 is merely exemplary and can include any system whereby remote modules, such as wireless communication devices 302, communicate over-the-air between and among each other and/or between and among other components of a wireless and/or wired network, including, without limitation, wireless network carriers, and/or servers.

In FIG. 3, an illustrative mobile communication device 400 can serve as client device for remotely accessing and controlling persistent messaging services via a graphical user interface (GUI) 402, which can include physical controls such as dial tone multi-function (DTMF) keypad 404, with four cursor keys 406 and select button 408, and left, middle and right menu buttons 410, 412, 414. Alternatively or in addition, the GUI 402 can be a touch screen. The GUI 402 can include a display 416 as depicted. Alternatively, a display with touch screen capability can also be used to provide soft input controls (not shown). The display 416 can depict a dynamic messaging interface 418 organized under a hierarchy of tabs of a messaging tab 420, player 422 tab, a find tab 424 and a links tab 426. The interface 418 can include historical conversation threads 428 made by the user from a different device (not shown). These threads can be located, selected, saved via menu options 428, 430, and 432, respectively.

The GUI 402 can also provide an opportunity to set personal interests, as depicted at 434. An advertising banner 436, that can be interactive, can be received based upon an interest 132 incorporated into the user tuple 116 (FIG. 1), set by the "select interests" control 434. Similarly, a shout message 138 can be presented also based on the interest 132 incorporated into the user tuple 116 (FIG. 1), set by the "select interests" control 434.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

Figure 4:
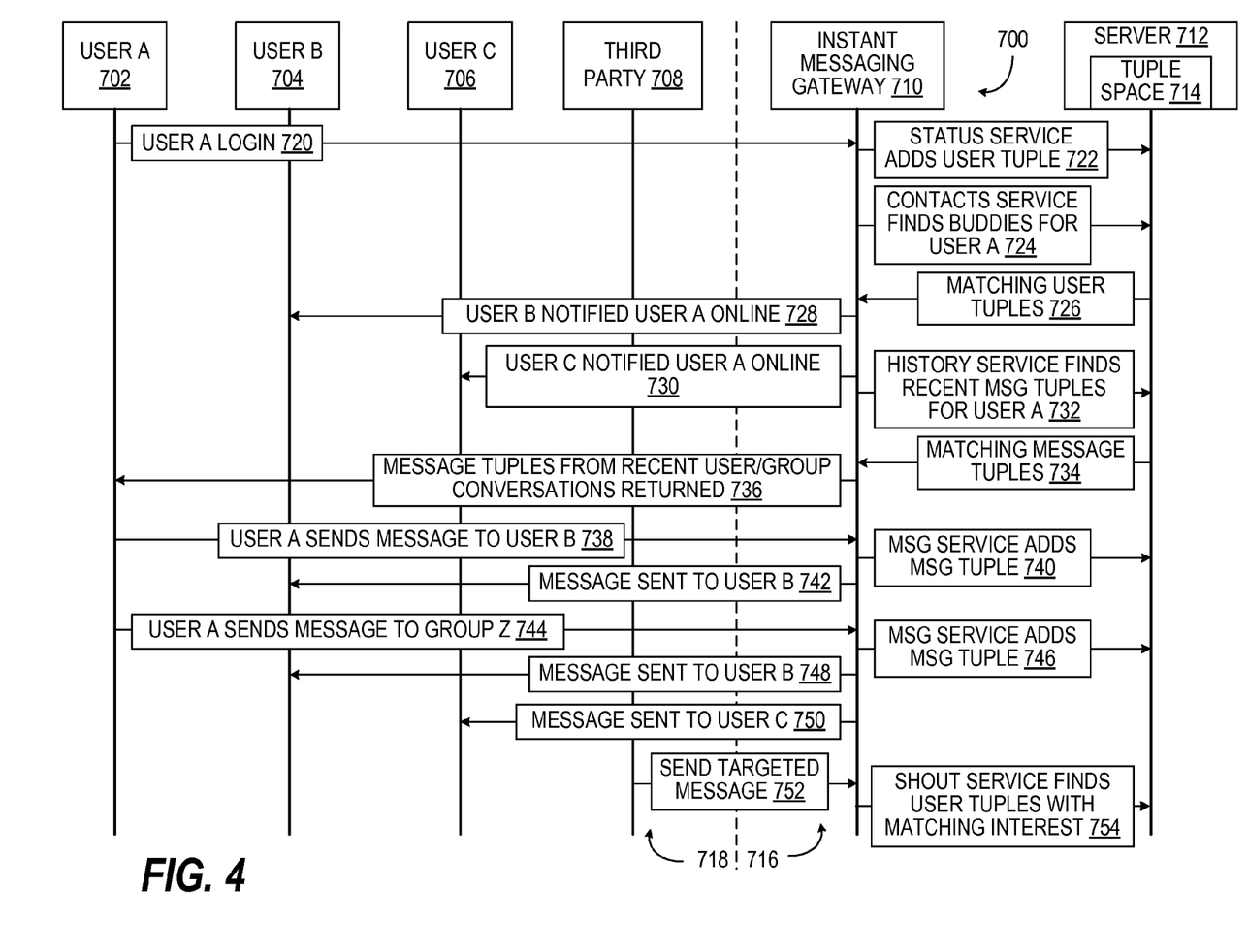
FIGS. 4-5 are timing diagrams of a methodology for persistent personal messaging and super groups, according to one aspect.
Figure 5:
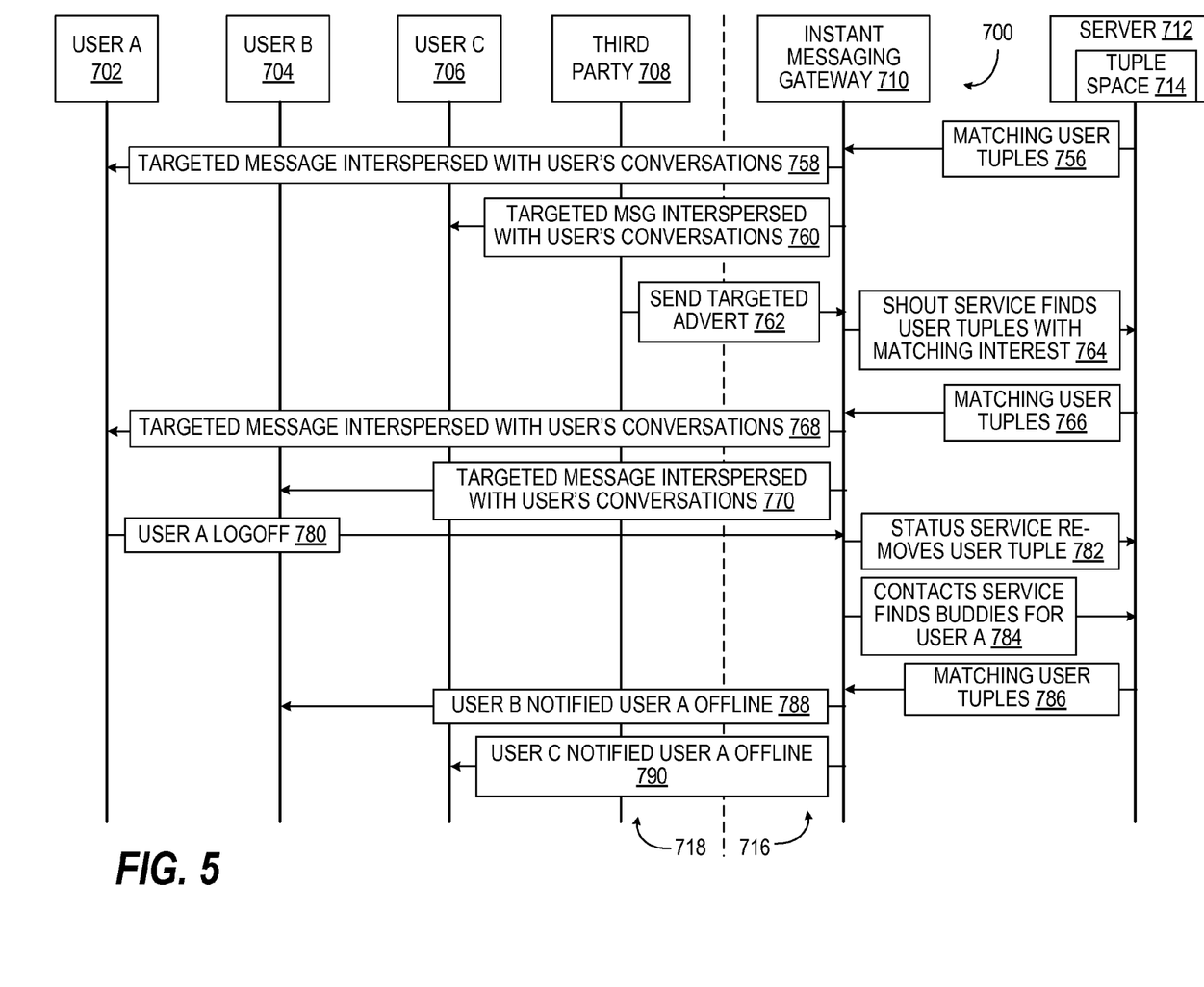

In FIGS. 4-5, an illustrative methodology 700 is depicted for a User "A" 702, User "B" 704, User "C" 706, and a Third Party 708 interacting via an instant messaging gateway 710 to a server 712 that hosts a tuple space 714. A persistent messaging service 716 provided by the tuple space 714 provides individual, group, shout, and advert persistent messaging services for a subscriber population 718.

With initial reference to FIG. 4, as depicted at 720, the User A 710 logins into a persistent messaging service by transmitting to the instant messaging gateway 710. As depicted at 722, the gateway 710 causes a status service tuple to add a user tuple to the tuple space 714 and as depicted at 724 causes a contacts service tuple to find buddies for User A. Matching user tuples are returned by the tuple space 714 to the instant messaging gateway 710, as depicted at 726, which in turn notifies User B 704 as depicted at 728 and User C 706 as depicted at 730 that User A is online. As depicted at 732, the history service tuple placed by the gateway 710 finds recent message tuples for User A 702, which are returned as depicted 734 by the tuple space 714.

As depicted at 736, the gateway 710 returns the recent user/group conversation threads to User A 702. Continuing a conversation, the User A 702 sends a message intended for User B 704 as depicted at 738 to the gateway 710. The gateway 710 causes the message service to add a message tuple in tuple space 714 for this message as depicted at 740 and relays the message to User B 704 as depicted at 742.

As depicted at 744, User A can also continue a group conversation for a Group Z comprised of User B 704 and User C 706 by sending a message intended for Group Z to the gateway 710. The gateway 710 causes the message service to add a message tuple in tuple space 714 for this group message as depicted at 746 and relays the group message to User B 704 as depicted at 748 and to User C 706 as depicted at 750.

In addition to individual messages and group messages, the persistent messaging service can support shout messages to those sharing an interest rather than being part of a defined group. As depicted at 752, the Third Party 708 sends a shout message to the gateway 710 that causes the shout service tuple to find user tuples with a matching interest as depicted at 754.

Continuing with reference to FIG. 5, the tuple space 714 returns with matching user tuples to gateway 710 as depicted at 756. The gateway 710 in turn relays the targeted (shout) message interspersed with user conversations to those identified users, depicted respectively at 758 and 760 to User A 702 and User C 706.

In addition to individual, group, and shout persistent messaging, as depicted at 762, the Third Party 708 can send a targeted advertisement ("advert") to the gateway 710. In response, the gateway 710 causes the shout service to find user tuples with a matching interest in tuple space 714, as depicted at 764, which in turn returns matching user tuples as depicted at 766. The gateway 710 intersperses the targeted message (advert) to the identified users, depicted respectively at 768 and 770 to User A 702 and User B 704.

When User A causes a logoff indication to go to gateway 710 as depicted at 780, the gateway 710 causes the status service tuple to remove the user tuple from the tuple space 714 as depicted at 782. The gateway 710 causes the contact service tuple to find buddies for User A 702 in tuple space 714 as depicted at 784. In turn, the tuple space 714 returns matching user tuples to the gateway 710 as depicted at 786. The gateway 710 uses these identified buddies to send a message that User A 702 is offline to User B 704 and User C 706 as depicted respectively at 788 and 790.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or versions, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for providing persistent messaging services to a population of client devices connected to a distributed network, comprising:
    placing a user tuple in a tuple space for a user initiating active communications with a persistent messaging service from a client device;
    locating a message tuple stored in the tuple space that matches the user tuple for a prior messaging session; and
    sending a historical message derived from the message tuple to the client device,
    wherein the historical message comprises at least a portion of the prior messaging session.

2. The method of claim 1, further comprising:
    locating a buddy user associated with the user by using a contact service tuple to match an attribute of a buddy user tuple in the tuple space; and
    notifying a client device of the buddy user that the user is accessible to messaging.

3. The method of claim 1, further comprising:
    receiving a new message from the user intended for a buddy user;
    identifying the buddy user with a contact service tuple matching an attribute of the user tuple in the tuple space; and
    relaying the message to a client device of the buddy user.

4. The method of claim 3, further comprising placing a new message tuple containing the new message in the tuple space.

5. The method of claim 1, further comprising:
    receiving a new message from the user intended for a predefined group of users;
    identifying each accessible member of the predefined group of users with a contact service tuple matching an attribute of a plurality of user tuples in the tuple space; and
    relaying the new message to respective client devices of the accessible members.

6. The method of claim 5, further comprising placing a new message tuple containing the new message in the tuple space.

7. The method of claim 1, further comprising:
    receiving a new message having an interest attribute from the user intended for distribution to an unspecified subset of accessible users;
    identifying a subset of accessible users with a shout service tuple matching the interest attribute with a plurality of user tuples in the tuple space; and
    relaying the new message to respective client devices of the accessible users.

8. The method of claim 7, wherein the new message comprises an advertisement.

9. The method of claim 1, further comprising locating an interface object in the tuple space in response to a client device requesting messaging service.

10. The method of claim 1, further comprising:
receiving an indication from the client device of the user that the user is no longer accessible to the persistent messaging service;
locating a buddy user associated with the user by using a contact service tuple to match an attribute of a buddy user tuple in the tuple space; and
notifying a client device of the buddy user that the user is not accessible to messaging.

11. At least one processor for providing persistent messaging services to a population of client devices connected to a distributed network, comprising:
a first hardware module for placing a user tuple in a tuple space for a user initiating active communications with a persistent messaging service from a client device;
a second module for locating a message tuple stored in the tuple space that matches the user tuple for a prior messaging session; and
a third module for sending a historical message derived from the message tuple to the client device,
wherein the historical message comprises at least a portion of the prior messaging session.

12. A computer program product for providing persistent messaging services to a population of client devices connected to a distributed network, comprising:
a non-transitory computer-readable medium, comprising:
at least one instruction for causing a computer to place a user tuple in a tuple space for a user initiating active communications with a persistent messaging service from a client device;
at least one instruction for causing the computer to locate a message tuple stored in the tuple space that matches the user tuple for a prior messaging session; and
at least one instruction for causing the computer to send a historical message derived from the message tuple to the client device,
wherein the historical message comprises at least a portion of the prior messaging session.

13. An apparatus for providing persistent messaging services to a population of client devices connected to a distributed network, comprising:
means for placing a user tuple in a tuple space for a user initiating active communications with a persistent messaging service from a client device;
means for locating a message tuple stored in the tuple space that matches the user tuple for a prior messaging session; and
means for sending a historical message derived from the message tuple to the client device,
wherein the historical message comprises at least a portion of the prior messaging session.

14. An apparatus for providing persistent messaging services to a population of client devices connected to a distributed network, comprising:
a computing platform hosting a tuple space performing a persistent messaging service;
a communication network; and
a messaging gateway placing a user tuple in the tuple space for a user initiating active communication between a client device and the messaging gateway via the communication network, the messaging gateway further locating a message tuple stored in the tuple space that matches the user tuple for a prior messaging session, and sending a historical message derived from the message tuple to the client device via the communication network,
wherein the historical message comprises at least a portion of the prior messaging session.

15. The apparatus of claim 14, further comprising the messaging gateway locating a buddy user associated with the user by using a contact service tuple to match an attribute of a buddy user tuple in the tuple space, and notifying via the communication network a client device of the buddy user that the user is accessible to messaging.

16. The apparatus of claim 14, further comprising the messaging gateway receiving via the communication network a new message from the user intended for a buddy user, identifying the buddy user with a contact service tuple matching an attribute of the user tuple in the tuple space, and relaying the new message to a client device of the buddy user via the communication network.

17. The apparatus of claim 16, further comprising the messaging gateway placing a new message tuple containing the new message in the tuple space.

18. The apparatus of claim 14, further comprising the messaging gateway receiving via the communication network a new message from the user intended for a predefined group of users, identifying each accessible member of the predefined group of users with a contact service tuple matching an attribute of a plurality of user tuples in the tuple space, and relaying the new message to respective client devices of the accessible members via the communication network.

19. The apparatus of claim 18, further comprising the messaging gateway placing a new message tuple containing the new message in the tuple space.

20. The apparatus of claim 14, further comprising the messaging gateway receiving via the communication network a new message having an interest attribute from the user intended for distribution to an unspecified subset of accessible users, identifying the subset of accessible users with a shout service tuple matching the interest attribute with a plurality of user tuples in the tuple space, and relaying the new message to respective client devices of the accessible users.

21. The apparatus of claim 20, wherein the new message comprises an advertisement.

22. The apparatus of claim 14, further comprising the messaging gateway locating an interface object in tuple space in response to a client device requesting messaging service via the communication network.

23. The apparatus of claim 14, further comprising the messaging gateway receiving via the communication network an indication from the client device of the user that the user is no longer accessible to the persistent messaging service, locating a buddy user associated with the user by using a contact service tuple to match an attribute of a buddy user tuple in the tuple space, and notifying via the communication network a client device of the buddy user that the user is not accessible to messaging.

24. A method for receiving persistent messaging services from a distributed network, comprising:
initiating active communications with a persistent messaging service from a client device to cause placement of a user tuple in a tuple space for a user, and to cause locating of a message tuple stored in the tuple space that matches the user tuple for a prior messaging session; and
receiving a historical message derived from the message tuple to the client device,
wherein the historical message comprises at least a portion of the prior messaging session.

25. The method of claim 24, further comprising:
initiating active communications with the persistent messaging service from the client device to further cause locating a buddy user associated with the user by using a contact service tuple to match an attribute of a buddy user tuple in the tuple space, and thus causing a notification to a client device of the buddy user that the user is accessible to messaging.

26. The method of claim 24, further comprising sending a new message intended for a buddy user that causes identification of the buddy user with a contact service tuple matching an attribute of the user tuple in the tuple space and that causes relaying the new message to a client device of the buddy user.

27. The method of claim 26, further comprising sending the new message intended for the buddy user to cause placement of a new message tuple containing the new message in the tuple space.

28. The method of claim 24, further comprising sending a new message intended for a predefined group of users to cause identification of each accessible member of the predefined group of users with a contact service tuple matching an attribute of a plurality of user tuples in the tuple space, and to cause relaying of the new message to respective client devices of the accessible members.

29. The method of claim 28, further comprising sending the new message intended for the predefined group of users to cause placement of a new message tuple containing the new message in the tuple space.

30. The method of claim 24, further comprising sending a new message having an interest attribute for distribution to an unspecified subset of accessible users to cause identification of a subset of accessible users with a shout service tuple matching the interest attribute with a plurality of user tuples in the tuple space, and to cause relaying of the new message to respective client devices of the accessible users.

31. The method of claim 30, wherein the new message comprises an advertisement.

32. The method of claim 24, further comprising requesting messaging service to cause locating of an interface object in the tuple space.

33. The method of claim 24, further comprising sending an indication that the user is no longer accessible to the persistent messaging service to cause locating a buddy user associated with the user by using a contact service tuple to match an attribute of a buddy user tuple in the tuple space, and to cause notifying a client device of the buddy user that the user is not accessible to messaging.

34. At least one processor for receiving persistent messaging services from a distributed network, comprising:
a first hardware module for initiating active communications with a persistent messaging service from a client device to cause placement of a user tuple in a tuple space for a user, and to cause locating of a message tuple stored in the tuple space that matches the user tuple for a prior messaging session; and
a second module for receiving a historical message derived from the message tuple to the client device,
wherein the historical message comprises at least a portion of the prior messaging session.

35. A computer program product for receiving persistent messaging services from a distributed network, comprising:
a non-transitory computer-readable medium, comprising:
at least one instruction for causing a computer to initiate active communications with a persistent messaging service from a client device to cause placement of a user tuple in a tuple space for a user, and to cause locating of a message tuple stored in the tuple space that matches the user tuple for a prior messaging session; and
at least one instruction for causing the computer to receive a historical message derived from the message tuple to the client device,
wherein the historical message comprises at least a portion of the prior messaging session.

36. An apparatus for receiving persistent messaging services from a distributed network, comprising:
means for initiating active communications with a persistent messaging service from a client device to cause placement of a user tuple in a tuple space for a user, and to cause locating of a message tuple stored in the tuple space that matches the user tuple for a prior messaging session; and
means for receiving a historical message derived from the message tuple to the client device,
wherein the historical message comprises at least a portion of the prior messaging session.

37. An apparatus for receiving persistent messaging services from a distributed network, comprising:
a transmitter and a receiver;
a communication module for controlling the transmitter and the receiver for communicating over a communication network to a gateway that operably interacts with a tuple space performing a persistent messaging service; and
a user interface for initiating active communications with a persistent messaging service via the communication module to cause placement of a user tuple in the tuple space for a user, and to cause locating of a message tuple stored in the tuple space that matches the user tuple for a prior messaging session,
wherein the user interface receives via the receiver and communication module a historical message derived from the message tuple to a client device, and
wherein the historical message comprises at least a portion of the prior messaging session.

38. The apparatus of claim 37, further comprising the user interface initiating active communications via the communication module with the persistent messaging service from the client device to further cause locating a buddy user associated with the user by using a contact service tuple to match an attribute of a buddy user tuple in the tuple space, and thus causing a notification to a client device of the buddy user that the user is accessible to messaging.

39. The apparatus of claim 37, further comprising the user interface sending a new message via the communication module intended for a buddy user that causes identification of the buddy user with a contact service tuple matching an attribute of the user tuple in the tuple space and that causes relaying the new message to a client device of the buddy user.

40. The apparatus of claim 39, further comprising the user interface sending the new message intended for the buddy user to further cause placement of a new message tuple containing the new message in the tuple space.

41. The apparatus of claim 37, further comprising the user interface sending a new message via the communication module intended for a predefined group of users to cause identification of each accessible member of the predefined group of users with a contact service tuple matching an attribute of a plurality of user tuples in the tuple space, and to cause relaying of the new message to respective client devices of the accessible members.

42. The apparatus of claim 41, further comprising the user interface sending the new message intended for the predefined group of users to further cause placement of a new message tuple containing the new message in tuple space.

43. The apparatus of claim 37, further comprising the user interface sending via the communication module a new message having an interest attribute for distribution to an unspecified subset of accessible users to cause identification of a subset of accessible users with a shout service tuple matching the interest attribute with a plurality of user tuples in tuple space, and to cause relaying of the new message to respective client devices of the accessible users.

44. The apparatus of claim 43, wherein the new message comprises an advertisement.

45. The apparatus of claim 37, further comprising the user interface requesting via the communication module the persistent messaging service to cause locating of an interface object in the tuple space.

46. The apparatus of claim 37, further comprising the user interface sending via the communication module an indication that the user is no longer accessible to the persistent messaging service to cause locating a buddy user associated with the user by using a contact service tuple to match an attribute of a buddy user tuple in the tuple space, and to cause notifying a client device of the buddy user that the user is not accessible to messaging.

* * * * *